United States Patent [19]

Arai et al.

[11] Patent Number: 5,035,210
[45] Date of Patent: Jul. 30, 1991

[54] PISTON ASSEMBLY OF INTERNAL COMBUSTION ENGINE

[75] Inventors: Takayuki Arai, Yokosuka; Takaharu Goto, Yokohama; Kyugo Hamai, Yokosuka, all of Japan

[73] Assignee: Nissan Motor Co., Ltd., Japan

[21] Appl. No.: 557,081

[22] Filed: Jul. 25, 1990

[30] Foreign Application Priority Data

Jul. 31, 1989 [JP] Japan ................................ 1-196944

[51] Int. Cl.$^5$ .............................................. F02F 3/00
[52] U.S. Cl. .................. 123/193 P; 92/208; 277/216
[58] Field of Search ............ 123/193 P; 92/208; 277/144, 216, 217, 222

[56] References Cited

U.S. PATENT DOCUMENTS

| | | | |
|---|---|---|---|
| 3,862,480 | 1/1975 | Packard et al. | 277/216 |
| 4,079,661 | 3/1978 | Goloff | 92/208 |
| 4,193,179 | 3/1980 | Confer et al. | 92/208 |
| 4,838,149 | 6/1989 | Donnison et al. | 123/193 P |

Primary Examiner—Andrew M. Dolinar
Assistant Examiner—M. Macy
Attorney, Agent, or Firm—Lowe, Price, LeBlanc & Becker

[57] ABSTRACT

A piston assembly of an internal combustion engine is provided with a piston structure with which oil comsumption is suppressed. A piston of the assembly is disposed inside each cylinder wall of the engine and formed with a top land and the second land. A compression ring groove is formed between the top and second lands. A first chamfered surface is formed at the upper peripheral edge of the second land, and a second chamfered surface larger in width than the first chamfered surface is formed at the lower peripheral edge of the top land. A compression ring having a butt-type ring gap is disposed in the compression ring groove to be slidably contacted with the cylinder wall. With this structure, the oil comsumption is effectively suppressed in both high pressure and negative pressure conditions during operation of the combustion chamber corresponding to the cylinder.

6 Claims, 5 Drawing Sheets

PISTON ASSEMBLY OF INTERNAL COMBUSTION ENGINE

BACKGROUND OF THE INVENTION

1. Field of the Invention

This invention relates to improvements in a piston assembly of an internal combustion engine, by which engine oil consumption is reduced under a high load condition of the engine and under a negative pressure condition in a corresponding combustion chamber of the engine.

2. Description of the Prior Art

It is well known that various compression rings for pistons have been proposed to reduce oil consumption in internal combustion engines.

One of these compression rings is shown in FIG. 8 of the present application and is disclosed, for example, in Japanese Utility Model Provisional Publication No. 59-126158. Another is shown in FIG. 9 of the present application is disclosed, for example, in Japanese Patent Provisional Publication No. 62-251457.

In FIG. 8, compression ring 10 is such arranged so that its opposite end sections partially overlap to each other. One end section of the compression ring 10 has a recess 14 in a corner formed by an outer periphery 11, an upper surface 12 and an end surface 13. The upper surface 12 is on the side of a corresponding combustion chamber. The other end section of the compression ring 10 has a projection 15 which extends over the first end section to lie upon the recess 14 so as to be in tight contact with the surface of the recess 14.

In FIG. 9, compression ring 16 has opposite end surfaces 17. A lower section of each end surface 17 is chamfered by machining to form a chamfered surface, so that the compression ring 16 has a clearance $C_4$ between opposite upper sections of its end surfaces 17 and a clearance $C_5$, larger than the clearance $C_4$, between opposite lower edges of the chamfered surface.

With an engine having the compression ring 10 or 16, when the combustion chamber of the engine is under a high pressure condition such as during a high load engine operation, lubrication oil is blown down by blow-by gas. In case that the combustion chamber of the engine is under a negative pressure condition such as during an engine-brake operation, the lubrication oil is prevented from being sucked into the combustion chamber. Therefore, the oil consumption is suppressed in both cases.

However, difficulties have been encountered in the above-mentioned arrangements, as follows.

In the structure of FIG. 8, since the end sections of the compression ring 10 have to be formed to a complicated shape and the projection 15 is formed in a blade shape, the cost of machining the ring 10 becomes high while degrading the durability of the ring 10.

In the structure of FIG. 9, since the end sections of the compression ring 16 are formed to a complicated shape, the cost of machining the ring becomes high. Furthermore, since lubrication oil tends to stay at the end surfaces 17 of the compression ring 16, the oil blow-down by the blow-by gas is degraded. Therefore, the oil consumption reduction by the ring 16 is degraded.

SUMMARY OF THE INVENTION

It is an object of the present invention to provide an improved piston assembly for an internal combustion engine with which oil consumption is suppressed, while lowering its machining cost and improving its durability.

This objective is realized by providing a piston assembly of an internal combustion engine disposed in a cylinder of said engine. The piston assembly comprises a piston which includes a top land formed at an upper part thereof. The top land has a first chamfered surface at a lower peripheral edge thereof. A second land is formed under the top land and has a second chamfered surface at an upper peripheral edge thereof. The second chamfered surface has a width larger than that of the first chamfered surface. The top and second lands defines a compression ring groove therebetween. A compression ring is disposed in the ring groove to be slidably contacted with the cylinder. The compression ring has opposite ends surfaces defining a gap.

With the above arrangement, the oil consumption is effectively suppressed in both high pressure and negative pressure conditions of a corresponding combustion chamber.

DETAILED DESCRIPTION OF THE INVENTION

Figure 1A:
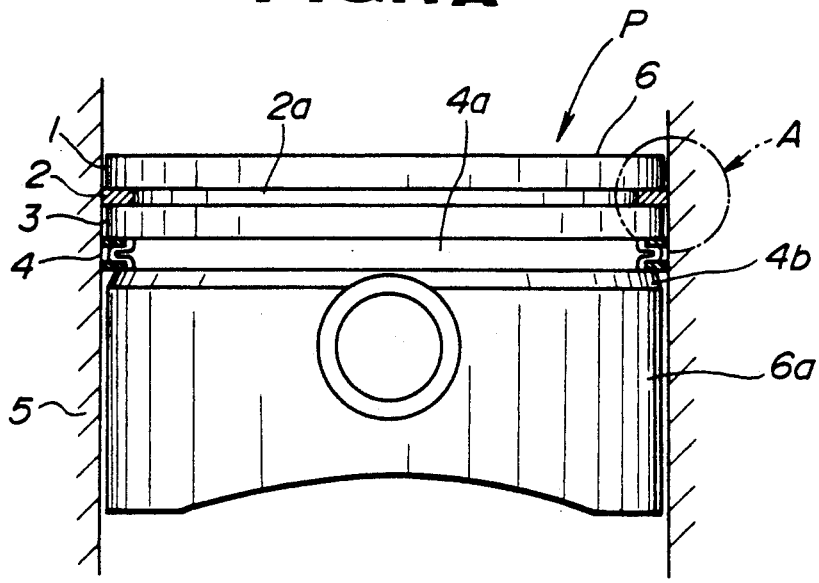
FIG. 1A is a side view, partly in section, of an embodiment of a piston assembly for an internal combustion engine according to a preferred embodiment of the present invention.

Referring now to FIGS. 1A to 5B there is seen an embodiment of a piston assembly P according to the present invention. The piston assembly P comprises a piston 6 having a compression ring 2 and an oil ring 4. The compression ring 2 is disposed in a compression ring groove 2a formed between a top land 1 and a second land 3 of the piston 6. The oil ring 4 is disposed in an oil ring groove 4a formed between the second land 3 and a shoulder section 4b of a piston skirt 6a. A lower peripheral edge of the top land 1 is chamfered by machining to form a chamfered surface 1a having a width $C_1'$ (in FIG. 1C) not larger than 0.1 mm. The width $C_1'$ is made as small as possible. than 0.1 mm. The width $C_1'$ is as small as possible. The chamfered surface 1a extends annularly along the outer periphery of the piston 6. An upper peripheral edge of the second land 3 is chamfered by machining to form thereat a chamfered surface 3a. . Both chamfer widths $C_1$, and $C_1$ are measured in a radial direction of the piston P. The chamfered surface 3a extends annularly along the outer periphery of the piston 6. The width $C1$ (in FIG. 4A) of the chamfered surface 3a is set at a predetermined value so that a pressure in a space formed between the second land 3 and the wall of a cylinder 5 becomes larger than a predetermined level. The wall of the cylinder 5 may be part of a cylinder liner. Therefore, the chamfered surface 1a of the top land 1 is formed smaller in width than the chamfered surface 3a of the second land 3.

Figure 2:
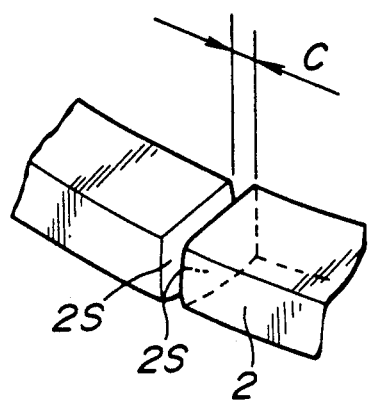
FIG. 2 is a fragmentary perspective view of a compression ring used in the present invention.

As shown in FIG. 2, the compression ring 1 has a butt-type piston ring gap C. Thus, the opposed end surfaces 2S,2S of the compression ring 2 are flat and perpendicular to an axis of the ring 2. The end surfaces 2S,2S are parallel with each other and spaced from each other to form the gap C. The gap C is determined to be as small as possible within a range to prevent contact of the end surface 2S,2S due to thermal expansion of the piston ring during engine operation.

The manner of operation of the thus arranged piston assembly will be discussed with reference to FIG. 3 and FIGS. 4A to 5B.

Figure 4A:
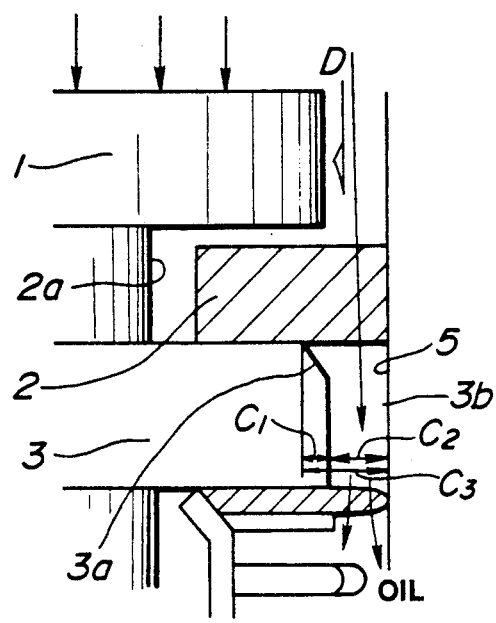
FIG. 4A is a fragmentary side view, partly in section, similar to FIG. 1B but depicting a high pressure condition of the combustion chamber.
Figure 4B:
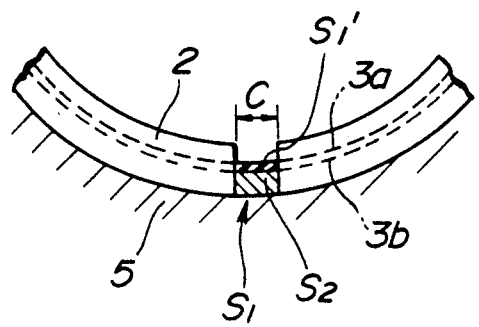
FIG. 4B is a fragmentary plan view taken in the direction of an arrow D of FIG. 4A.
Figure 5A:
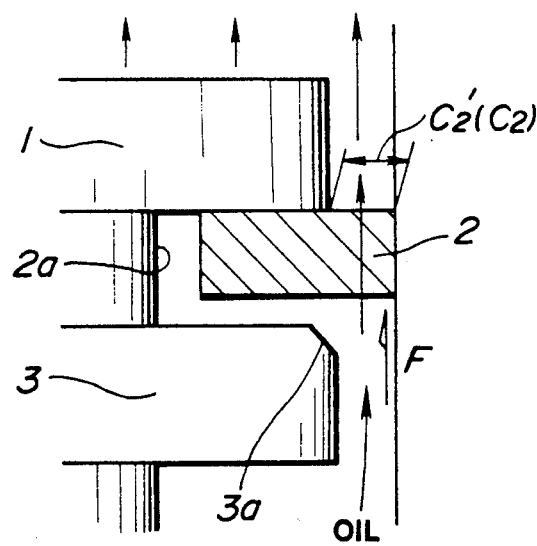
FIG. 5A is a fragmentary side view, partly in section, similar to FIG. 1B but depicting a negative pressure condition of the combustion chamber.

As shown in FIGS. 4A, 4B, 5A and 5B, $C_1$ indicates the width of the chamfered surface 3a. A clearance $C_2$ is a distance between the wall of the cylinder 5 and the peripheral surface of the second land 3. The cross-sectional area $S_1$ is defined by the gap C and a clearance $C_3$ which is equal to the total of the clearance $C_2$ and the clearance $C_1$ hence $C_3=(C_1+C_2)$. Therefore, the cross-sectional area $S_1=(C \times C_3)$. The cross-sectional area $S_2$ is generally defined by the gap C and the clearance $C_2$, and $S_2=(C \times C_2)$. Strictly speaking, the clearance $C_2$ in FIG. 5A is a clearance $C_2'$ which is the total of the clearance $C_2$ and the width $C_1'$ of the chamfered surface as shown in FIG. 1C, i.e., $C_2'=(C_1'+C_2)$. However, since the width of the chamfered surface 1a is sufficiently small, the clearance $C_2'$ virtually equals to the clearance $C_2$, so that the cross-sectional area $S_2$ may be defined by the product of clearance $C_2$ and the gap C.

Figure 3:
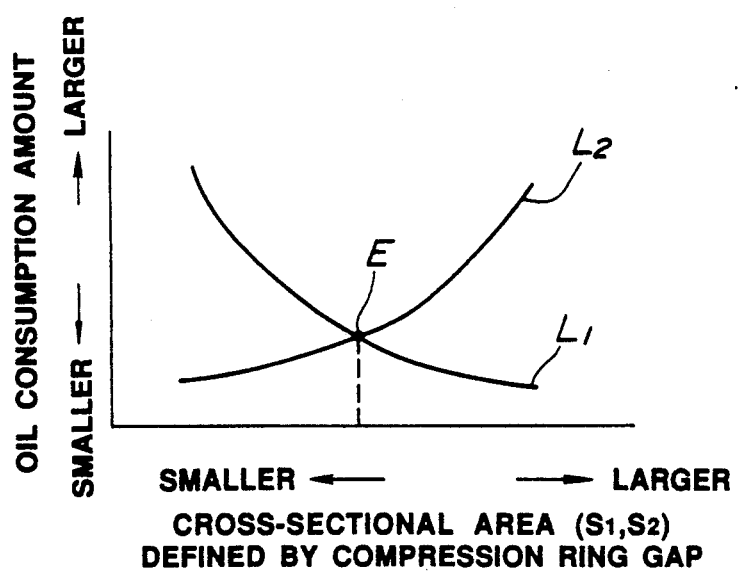
FIG. 3 is a graph showing a relationship between the amount of the oil consumption and a cross-sectional area of a passage defined by the end of the compression ring under high pressure and negative pressure conditions.

In FIG. 3, there are shown changes in oil consumption amount (the amount of lubricating oil consumed in the combustion chamber) under high and negative pressure conditions in the combustion chamber when the cross-sectional areas $S_1$ and $S_2$ are changed by a change of the gap C. A line $L_1$ represents the change in the oil consumption amount under a high pressure condition in the combustion chamber such as during a high load operation of the engine. The line $L_1$ indicates the fact that the oil consumption amount decreases with an increase in the cross-sectional area $S_1$. A line $L_2$ represents the change in the oil consumption amount under a negative pressure condition in the combustion chamber such as during an engine-brake operation. The line $L_2$ indicates the fact that the oil consumption amount increases with an increase in the cross-sectional area $S_2$.

As shown in FIG. 4A and 4B, when the combustion chamber is under the high pressure condition, the compression ring 2 is pressed on the upper surface of the second land 3 defining the ring groove 2a, so that the amount of blow-by gas is increased with an increase in the cross-sectional area $S_1$. Therefore, a force by which the oil is blown down is increased, so that the oil consumption is suppressed.

Figure 5B:
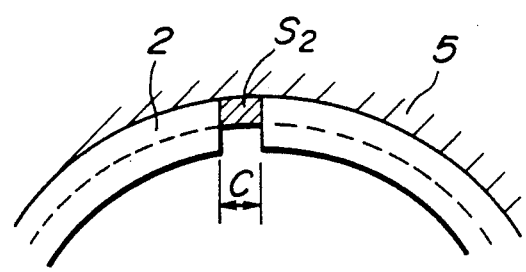
FIG. 5B is a fragmentary plan view taken in the direction of an arrow F of FIG. 5A.

As shown in FIGS. 5A and 5B, when the combustion chamber is under the negative pressure condition, the compression ring 2 is contacted with the lower surface of the top land 1 defining the ring groove 2a, so that the amount of the blow-by gas is decreased with a decrease in the cross-sectional area $S_2$. Therefore, a force by which the oil is blown up is lowered and the oil consumption is suppressed.

In considering how a change in the cross-sectional areas $S_1$ and $S_2$ is carried out merely by changing the size of the gap C, an optimum point to decrease the oil consumption amount under both a high pressure condition and a negative pressure condition corresponds to point E in FIG. 3.

Thus, in order to decrease the amount of the oil consumption under both the high pressure and the negative pressure conditions, it is preferable that the cross-sectional area $S_1$ be as large as possible whereas the cross-sectional area $S_2$ be as small as possible.

Figure 1B:
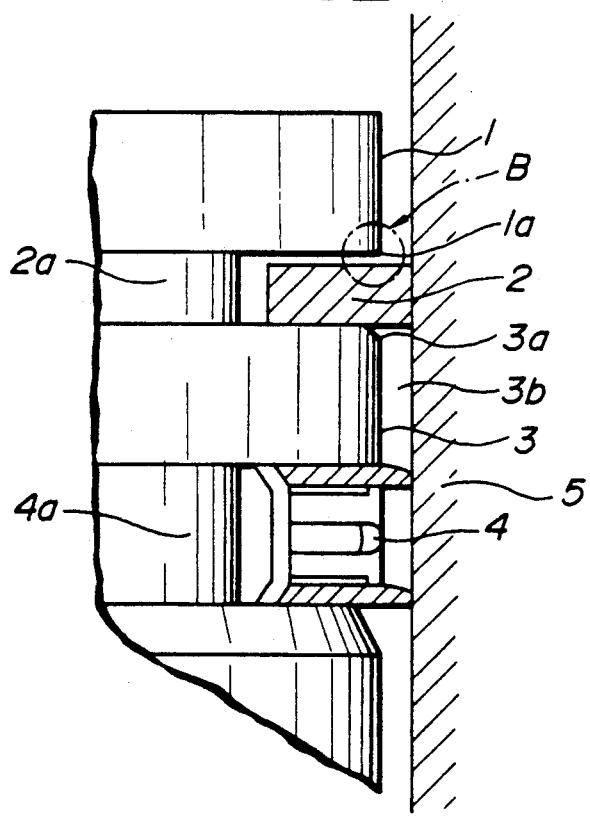
FIG. 1B is a partly enlarged sectional view (indicated by a circle A in FIG. 1A) of the piston assembly of FIG. 1A.
Figure 1C:
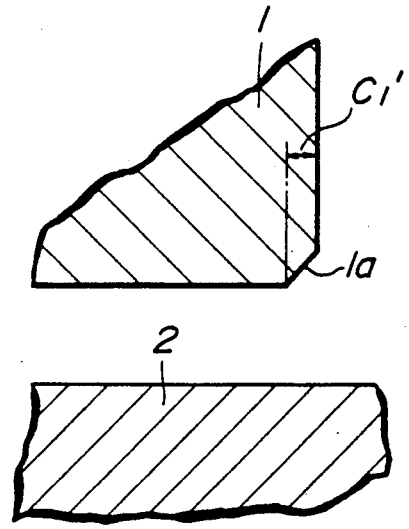
FIG. 1C is a fragmentary enlarged sectional view (indicated by a circle B in FIG. 1B) of the piston assembly of FIG. 1B.

In the embodiment shown in FIGS. 1 and 2, the gap C of the compression ring 2 is set at a minimum size within the range sufficient to prevent a contact of the end surfaces 2c due to thermal expansion under a driving condition of the engine. For example, the gap C is set at 0.2 mm for a compression ring used to a piston having a bore diameter of 83 mm. Further the chamfered surface 1a of the top land 1 is machined so that the width $C_1'$ of the chamfered surface 1a is not larger than 0.1 mm. Therefore, the cross-sectional area $S_2$ is made very small, so that the oil consumption is suppressed under a negative pressure condition.

As mentioned above, the cross-sectional are $S_2$ is defined by the gap C and the clearance $C_2$ i.e., $S_2=(C \times C_2)$ while the cross-sectional area $S_1$ is defined by the gap C and the clearance $C_3$. The cross-sectional area $S_1$ includes a cross-sectional area $S_1'$ which is defined by the gap C and the chamfered surface width $C_1$ is expressible by the expression $S_1=(C \times C_1)$ equals $C_1 \times C$, so that the cross-sectional area $S_1$ equals to the total of the cross-sectional area $S_2$ and the cross-sectional area $S_1'$, i.e., $S_1'+S_2$). Therefore, the cross-sectional area $S_1$ can be enlarged by selection of chamfered surface width $C_1$, so that the oil consumption is suppressed under a high pressure condition of the combustion chamber.

Figure 6:
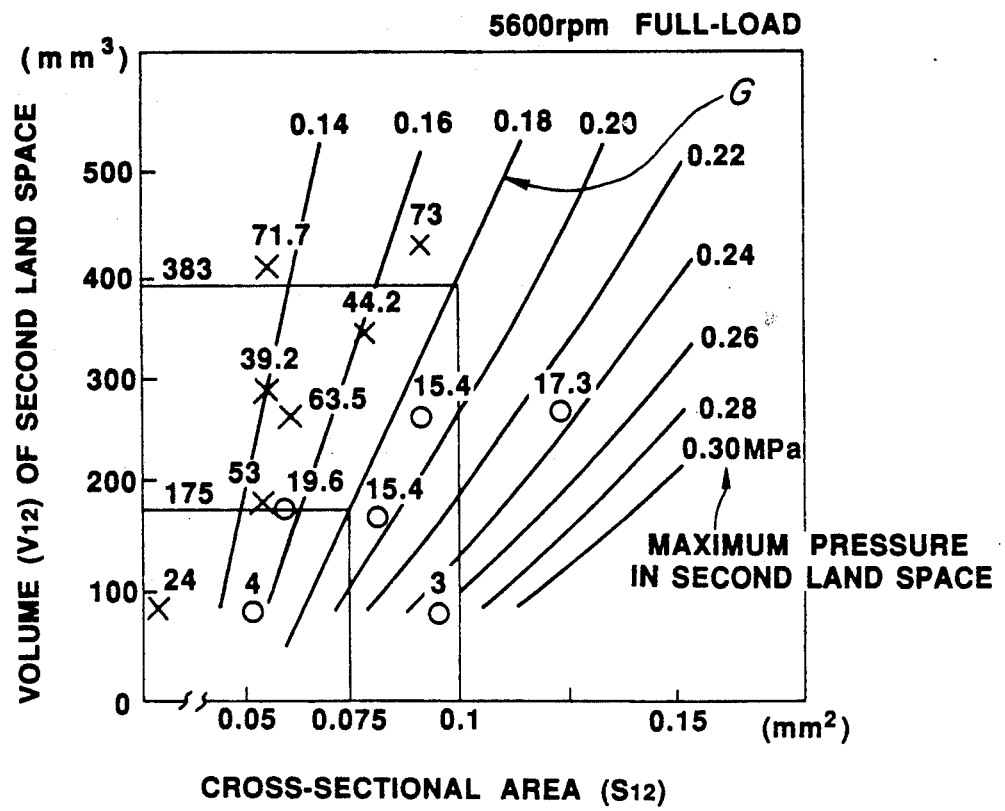
FIG. 6 is a graph showing the change of the oil consumption amount corresponding to the dimensional changes of various parts in the piston assembly.

The chamfered surface width $C_1$ of the peripheral upper edge of the second land 3 is determined according to the graph of FIG. 6 so that the pressure in a second land space 3b defined by the second land 3 and the wall of the cylinder 5 becomes not lower than 0.18 MPa. The graph of FIG. 6 is cited from a technical article titled "Sealing Performance of Two Rings Piston" in the transactions of the Society of Automotive Engineers of Japan Inc,. published on Apr. 25, 1988.

In connection with the above, it is preferable to satisfy the following equations, wherein the relationship between $S_{12}$ and $V_{12}$ is depicted by the straight line G in FIG. 6.

$$V_{12} \leq 8320 \, S_{12} - 449... \quad (1)$$

Equation (1) is conveniently rewritten as follows:

$$S_{12} \geqq (V_{12}+449)/8320 \quad (2)$$

where $S_{12}$ is the cross-sectional area defined by the compression ring 2, and $V_{12}$ is the volume of the second land space 3b.

In this embodiment, $$S_{12} = S_1' + S_2 \quad (3)$$

Equation (3) is rewritten as follows:

$$S_1' > (V_{12}+449)/8320 - S_2 \quad (4)$$

In this relational equation, $S_2$ is determined by the amount of the oil consumption under a negative pressure condition. The width of the chamfered surface 3a is a predetermined value with which the above-described equation (4) is satisfied.

With the thus arranged structure, since the compression ring 2 is so machined as not to be partially thinned nor to be complicated in shape, the machining cost for the ring is lowered. Furthermore, since the end section 2s is prevented from breakage or the like, the durability of the compression ring 2 is largely improved.

Additionally, since the oil is not held at the end sections 2S,2S of the oil compression ring in this arrangement, the oil consumption can be suppressed without minimizing the oil blow-down force by the blow-by gas.

Figure 7:
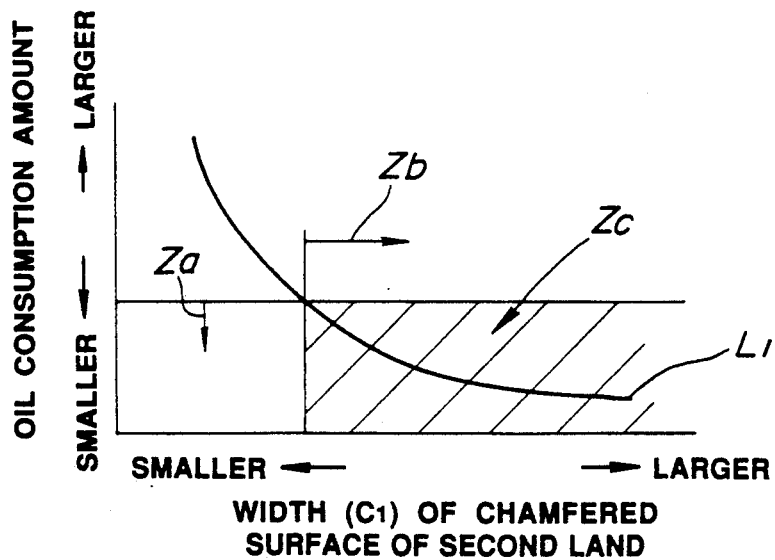
FIG. 7 is a graph showing the relationship between the oil consumption and the width of the chamfered surface the second land of a piston.
Figure 8:
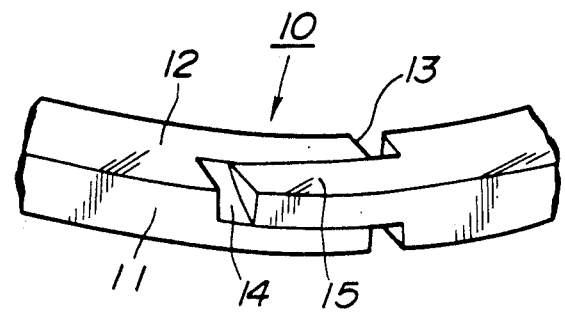
FIG. 8 is a fragmentary perspective view of a conventional compression ring.
Figure 9:
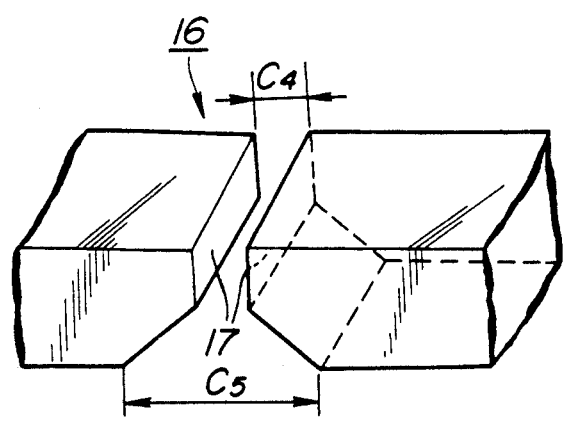
FIG. 9 is a fragmentary perspective view of another conventional compression ring.

In FIG. 7, Za indicates a zone within which oil consumption is permittable under a high pressure condition in the combustion chamber. A character Zb indicates a zone within which oil consumption is permittable under a negative pressure condition in the combustion chamber. Further, Zc indicates a zones common between the zone Za and Zb. Thus, in the zone Zc, the oil consumption is acceptable or is sufficiently suppressed under the high pressure and negative pressure conditions in the combustion chamber. In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A piston assembly of an internal combustion engine, disposed in a cylinder of said engine, said piston assembly comprising:
    a piston movably disposed in a cylinder of the engine and including,
        a top land formed at an upper part of said piston, said top land having a first chamfered surface at a lower peripheral edge thereof, and
        a second land formed under said top land, said second land having a second chamfered surface at an upper peripheral edge thereof, said second chamfered surface having a width larger than a width of said first chamfered surface, both widths being measured a radial direction of the piston, said top and second lands defining a compression ring groove therebetween; and
    a compression ring disposed in said compression ring groove to be slidably contacted with said cylinder, said compression ring having opposed end surface defining a gap.

2. A piston assembly as claimed in claim 1, wherein said gap is sized to be within a range sufficient to prevent a contact of said end surfaces of said compression ring under a thermal expansion thereof during engine operation.

3. An internal combustion engines as claimed in claim 1, further comprising means defining an oil ring groove which is formed below said second land, said oil ring groove receiving an oil ring therein.

4. A piston assembly as claimed in claim 3, wherein said compression ring gap, said second land and said second chamfered surface are in a dimensioned relationship given by the following equation:

$$S_1' > [(V_{12}+449)/8320] - S_2$$

wherein $S_1' = C \times C_1$),
    $S_2$ is a cross-sectional area defined by said gap and a clearance $C_2$ so that $S_2 = (C \times C_2)$ between a wall of said cylinder and said second land, and
    $V_{12}$ is a volume of a second land space defined by said second land, said cylinder wall, an upper surface of said oil ring and a lower surface of said compression ring.

5. A piston assembly as claimed in claim 1, further comprising:
    means defining a first gas passage which is defined by the cylinder, an upper surface of said ring groove and upper edges of opposite ends of said compression ring when said compression ring is contacted with the upper surface of said compression ring groove; and
    means defining a second gas passage which is defined by the cylinder, an upper surface of said compression ring groove and both ends of lower surface of said compression ring when said compression ring is contacted with the lower surface of said compression ring groove, a cross-sectional area of said second gas passage being larger than that of said first gas passage.

6. A piston assembly as claimed in claim 1, wherein: said compression ring opposed end surfaces are flat and perpendicular to an axis of said compression ring, said end surfaces being parallel with each other.

* * * * *